(12) United States Patent
Wu et al.

(10) Patent No.: US 8,184,052 B1
(45) Date of Patent: May 22, 2012

(54) DIGITAL BEAMFORMING SCHEME FOR PHASED-ARRAY ANTENNAS

(75) Inventors: Songping Wu, Cupertino, CA (US);
Manyuan Shen, Milpitas, CA (US);
Quan Zhou, Sunnyvale, CA (US);
Hongyuan Zhang, Sunnyvale, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 106 days.

(21) Appl. No.: 12/562,782

(22) Filed: Sep. 18, 2009

Related U.S. Application Data

(60) Provisional application No. 61/099,780, filed on Sep. 24, 2008.

(51) Int. Cl.
*H01Q 3/00* (2006.01)
*H01Q 3/26* (2006.01)

(52) U.S. Cl. ...................................................... 342/368

(58) Field of Classification Search .................. 342/367, 342/368, 377, 132–141; 455/132–141
See application file for complete search history.

(56) References Cited

U.S. PATENT DOCUMENTS

| | | | | |
|---|---|---|---|---|
| 6,009,124 | A * | 12/1999 | Smith et al. ..................... | 375/267 |
| 2006/0030364 | A1* | 2/2006 | Olesen et al. ............... | 455/562.1 |
| 2008/0063012 | A1* | 3/2008 | Nakao et al. .................. | 370/500 |
| 2008/0153428 | A1* | 6/2008 | Han et al. ......................... | 455/69 |
| 2009/0046012 | A1* | 2/2009 | Niu et al. ...................... | 342/377 |

OTHER PUBLICATIONS

IEEE Std 802.11b-2001 (Corrigendum to IEEE Std 802.11b-1999) "IEEE Standard for Information technology- Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

(Continued)

*Primary Examiner* — Thomas Tarcza
*Assistant Examiner* — Cassie Galt

(57) ABSTRACT

A method for beamforming in a communication system includes receiving a plurality of signals via a plurality of antennas, where the plurality of signals corresponds to at least one known training signal, generating a respective one of a plurality of different antenna weight vectors to be applied to the plurality of antennas as each of the plurality of signals is received, where each of the plurality of antenna weight vectors is a respective base vector of a unitary matrix, and generating a receiver antenna weight vector based on at least the received plurality of signals, the plurality of different antenna weight vectors, and the at least one known training signal.

15 Claims, 7 Drawing Sheets

OTHER PUBLICATIONS

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6 (2005).

K. McCabe, "IEEE 802.15.3™ Guide Addresses Untapped High-Rate Wireless Personal Area network (WPAN) Market," *The Institute of Electrical and Electronics Engineers, Inc.*, May 18, 2004.

"IEEE P802.11n /D3.00, Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," IEEE (Sep. 2007).

Zhang et al., "Applying Antenna Selection in WLANs for Achieving Broadband Multimedia Communications," IEEE Transactions on Broadcasting, vol. 52, No. 4, Dec. 2006.

\* cited by examiner

DIGITAL BEAMFORMING SCHEME FOR PHASED-ARRAY ANTENNAS

RELATED APPLICATION

This application claims the benefit of U.S. Provisional Patent App. No. 61/099,780 entitled "A New Digital Beamforming Scheme for Phased-Array Antennas," filed Sep. 24, 2008, the disclosure of which is hereby expressly incorporated herein by reference.

FIELD OF THE TECHNOLOGY

The disclosure relates generally to wireless communication systems and, more particularly, to techniques for generating beamforming vectors.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, the IEEE Standard 802.11n now in the process of being adopted, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11b. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

Antennas and, accordingly, associated effective wireless channels are highly directional at frequencies near or above 60 GHz. In general, path loss on a wireless communication link may be partially determined by such operational parameters as carrier frequencies and distances between communicating devices, and may be further affected by shadowing effects along transmission paths, channel fading due to reflection, scattering, oxygen absorption, etc., and other environmental factors. As a result, link budget (i.e., the aggregate of gains and losses associated with a communication channel) is frequently subject to a significant path loss.

When multiple antennas are available at a transmitter, a receiver, or both, it is therefore important to apply efficient beam patterns to the antennas to better exploit spatial selectivity and improve the link budget of the corresponding wireless channel. Generally speaking, beamforming or beam-steering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission. In addition to providing better link reliability, beamforming can greatly reduce the amount of power dissipated by transmitting devices. More specifically, beamforming allows a transmitting device to focus the transmission power in a particular direction when transmitting data to one or several receiving devices.

SUMMARY

In an embodiment, a method for beamforming in a communication system includes receiving a plurality of signals via a plurality of antennas, where the plurality of signals corresponds to at least one known training signal, generating a respective one of a plurality of different antenna weight vectors to be applied to the plurality of antennas as each of the plurality of signals is received, where each of the plurality of antenna weight vectors is a respective base vector of a unitary matrix, and generating a receiver antenna weight vector based on at least the received plurality of signals, the plurality of different antenna weight vectors, and the at least one known training signal.

In another embodiment, a method for beamforming in a communication system includes generating a plurality of different antenna weight vectors, where each of the plurality of antenna weight vectors is a respective base vector of a unitary matrix, transmitting at least one training signal via a plurality of antennas a plurality of times; where a respective antenna weight vector from the plurality of different antenna weight vectors is applied each time, receiving feedback indicative of respective quality values corresponding to the at least one signal transmitted the plurality of times and received at a receiver, and generating a transmitter antenna weight vector based on the feedback, the plurality of different antenna weight vectors, and the at least one training signal.

In yet another embodiment, an apparatus includes a base vector generator to provide a plurality of different antenna weight vectors, where each of the plurality of different antenna weight vectors is a respective base vector of a unitary matrix, a reference signal storage to store at least one training signal, and a vector selection unit configured to receive a plurality of signals, each received via a plurality of antennas using a different one of the plurality of different antenna weight vectors, and generate a receiver antenna weight vector based on the plurality of antenna weight vectors, the received plurality of signals, and the at least one training signal.

DETAILED DESCRIPTION

Figure 1:
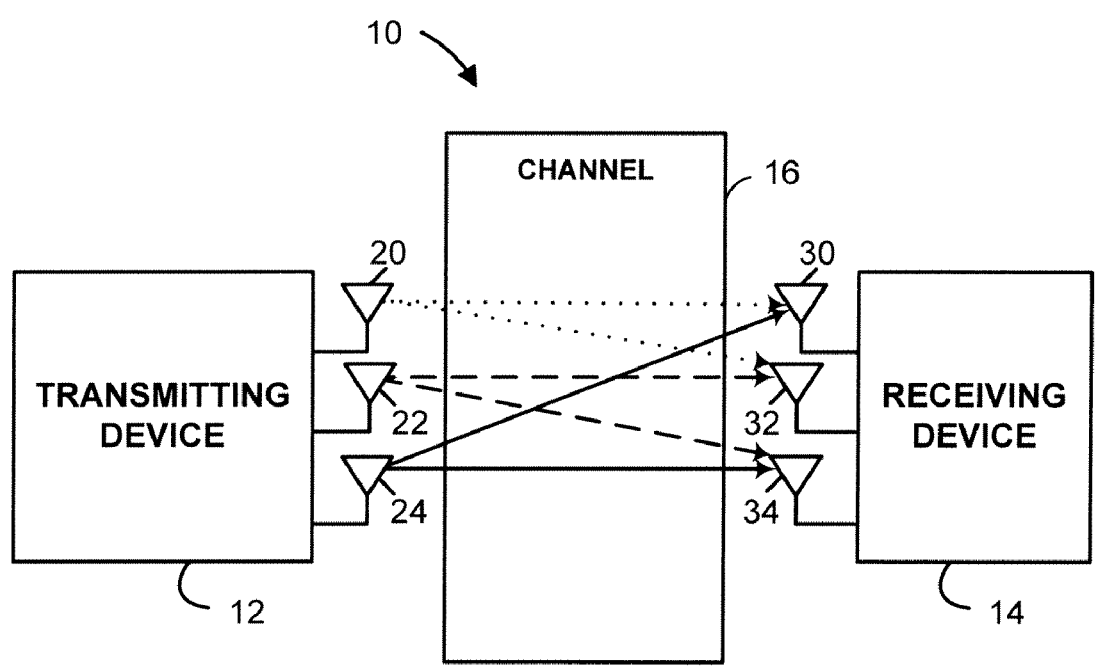
FIG. 1 is a block diagram of a communication system including a transmitting device and a receiving device, each having an antenna array, that may utilize efficient antenna weight vectors (AWVs) for beamforming techniques discussed herein.

FIG. 1 is a block diagram of an example wireless communication system 10 in which devices, such as a transmitting device 12 and a receiving device 14, use beamforming techniques discussed herein to significantly improve the quality and reliability of communications via a wireless communication channel 16. Each of the devices 12 and 14 may be, for example, a mobile station or a non-mobile station equipped with a set of one or more antennas 20-24 and 30-34, respectively. In general, the wireless communication system 10 may include any number of devices, each equipped with the same or a different number of antennas (e.g., 1, 2, 3, 4 antennas and so on). For beamforming, however, at least one of the devices 12, 14 generally should include more than one antenna. Further, the antennas 20-24 and 30-34 may define respective antenna arrays in at least some of the embodiments of the system 10.

During an Rx beamforming procedure, the receiving device 14 receives multiple training signals multiple times. For example, a same training signal, which may be known at the receiving device 14, may be received multiple times. As will be discussed in more detail below, the receiving device 14 can select several or all base vectors of a unitary matrix, and iteratively apply each of the selected vectors to the antenna array as an antenna weight vector (AWV) each time a training signal is received during the Rx beamforming procedure. As discussed in greater detail below, each element of an AWV assigns a particular weight parameter, or amplitude parameter and/or phase shift parameter, to a corresponding antenna. The multiple instances of the received training signal, each corresponding to the training signal received using a different AWV, define a received signal vector. Using the known training signals, the selected base vectors, and the received signal vector, the receiving device 14 generates an efficient receiver AWV to be used for subsequent reception of data via the channel 16. Further, the transmitting device 12 can apply a similar technique to generate an efficient transmitter AWV. To this end, the transmitting device 12 transmits training signals multiple times and applies a different AWV to the antenna array for each training signal, with each AWV selected from among the base vectors of a unitary matrix. The transmitting device 12 can then receive feedback from the receiving device 14 regarding the received signal vector (defined similarly to the Rx procedure discussed above), and use the training signals, the AWVs, and the received signal vector to generate an efficient transmitter AWV.

Although the wireless communication system 10 illustrated in FIG. 1 includes a transmitting device 12 and a receiving device 14, devices in the wireless communication system 10 can generally operate in multiple modes (e.g., a transmit mode and a receive mode). Accordingly, in some embodiments, antennas 20-24 and 30-34 support both transmission and reception, and each of the devices 12 and 14 operates as receiver and a transmitter. Alternatively or additionally, a given device may include separate transmit antennas and separate receive antennas.

Depending on the desired implementation, the antennas 20-24 and 30-34 of the transmitting device 12 and the receiving device 14, respectively, can operate as a part of a multiple input, multiple output (MIMO) system or as an antenna array. As is known, a channel between a transmitter and a receiver in MIMO wireless communication system includes a number of independent spatial channels. By utilizing the additional dimensionalities created by multiple spatial channels for the transmission of additional data, the MIMO system can provide improved spectral efficiency and link reliability. These benefits generally increase as the number of transmission and receive antennas within the MIMO system increases. However, in order to utilize multiple antennas in a MIMO mode, multiple radio frequency (RF) chains (e.g., amplifiers, mixers, analog-to-digital converters, etc.) are required, which increases costs.

By contrast, multiple antennas in an antenna array typically share a common RF chain, and generally require an architecture which is significantly less complex than the architecture of MIMO (or one of degenerate forms of MIMO such as SIMO or MISO). During beamforming, a communicating device (such as the transmitting device 12 or the receiving device 14) can vary the phase shift and/or amplitude of each antenna in the antenna array to control the radiation pattern and ultimately steer the beam. In the recent years, it has become common to control phase shifts and/or amplitudes of antennas digitally, i.e., by using a controller to generate signals determinative of specific phase shifts and/or amplitudes.

According to some implementations, transmitting or receiving devices equipped with multiple antennas control only the phase shift at each antenna. When an AWV includes only phase shift values, the antenna array to which the vector is applied is referred to as a phased antenna array. If, on other hand, each element in the AWV is a complex weight parameter that includes an amplitude and a phase shift component, the corresponding antenna array is referred to as a complex beamforming antenna array. It will be noted, however, that it is also common to use the shorter term "phased antenna array" to refer to both types of antenna arrays. As used herein, the term "phased antenna array" shall be construed broadly, and shall be understood to refer to antenna arrays in which one or both of the amplitude and phase shift of an antenna is controllable.

Figure 2:
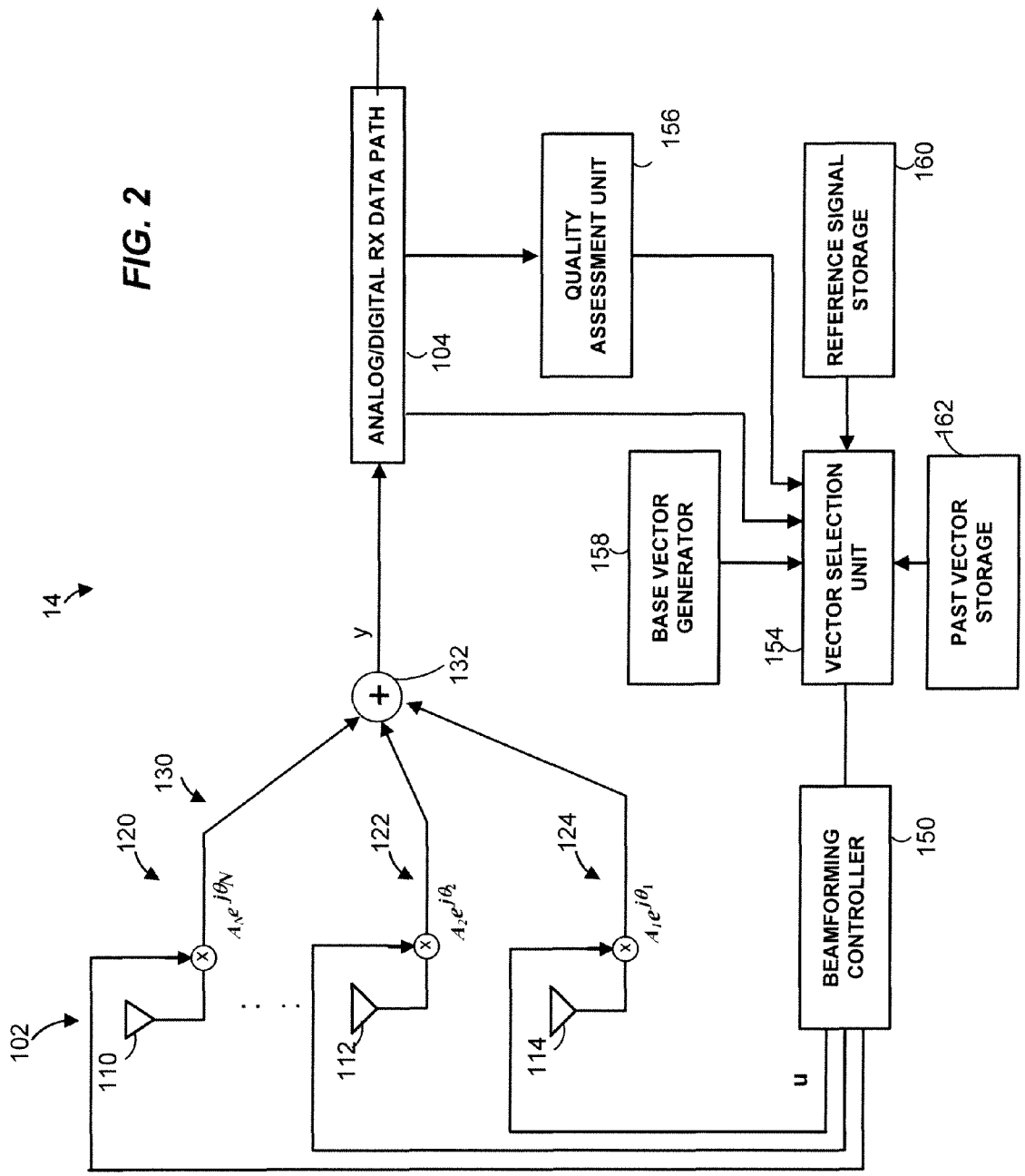
FIG. 2 is a block diagram of an example architecture of the receiving device of FIG. 1.

Next, FIG. 2 illustrates an example architecture of the receiving device 14 that includes an antenna array 102 connected to a shared analog/digital receiver data path 104. The antenna array 102 has $N_{rx}$ antennas including antennas 110, 112, and 114 coupled to respective delay lines 120, 122, and 124, which may be digitally controllable and which define a beamforming network 130. Each of the delay lines 120, 122, and 124 can shift the signal received from the corresponding antenna 110, 112, or 114 by a respective phase shifting angle θ. Together, the antenna array 102 and the delay lines 120, 122, and 124 define a phased antenna array of the receiving device 14.

For ease of illustration, FIG. 2 depicts the antenna array 102 as being controllable only by assigning respective phase shift values to the antennas 110, 112, and 114. However, in other embodiments, the antenna array 102 also includes a means for controlling the amplitude of the signal received at each antenna 110, 112, or 114 such as respective amplifiers. The amplifiers could be complex amplifiers to adjust both amplitude and phase, or scalar amplifiers for adjusting amplitude. It will be further noted that although some of the examples below focus on generating efficient phase-shift-only AWVs, the techniques discussed herein generally apply to AWVs that may also vary amplitudes.

An adder 132 may use any suitable technique to combine the signals from the antennas 110-114, shifted by the corresponding angles $\theta_1, \theta_2, \ldots \theta_{Nrx}$, prior to supplying the combined received signal y to the shared analog/digital receive data path 104. In general, the analog/digital receive data path 104 can include some or all of such components as an equalizer, a decoder, a de-interleaver, a demodulator, an A/D converter, a Fast Fourier Transform (FFT) processing block, etc.

Further, the receiving device 14 includes a beamforming controller 150 and a vector selection unit 154 communicatively coupled to a quality assessment unit 156, a base vector generator 158, a reference signal storage 160, and a past vector storage 162. In operation, the vector selection unit 154 supplies an AWV u or an indication of the AWV u to the beamforming controller 150. In the embodiment of FIG. 2, the AWV u specifies phase shifting angles $\theta_1, \theta_2, \ldots \theta_{Nrx}$ for each of the $N_{rx}$ antennas in the antenna array 102, and the beamforming controller 150 applies the angles $\theta_1, \theta_2, \ldots \theta_{Nrx}$ to the respective delay lines 120, 122, and 124. In other embodiments, the AWV u may specify an amplitude for each antenna, and the beamforming controller 150 applies the amplitudes to amplifiers in the delay lines 120, 122, and 124.

The base vector generator 158 supplies $N_{rx}$ AWVs $u_1, u_2 \ldots u_{Nrx}$ to the vector selection unit 154. More specifically, $N_{rx}$ vectors $u_1, u_2 \ldots u_{Nrx}$ define a complete set of base vectors of a unitary matrix U having $N_{rx}$ rows and $N_{rx}$ columns (i.e., the $N_{rx}$ vectors span the entire space of the matrix U). In some embodiments, the base vector generator 158 is a memory unit that stores the vectors $u_1, u_2 \ldots u_{Nrx}$. During beamforming, the vector selection unit 154 selects R vectors from the set $u_1, u_2 \ldots u_{Nrx}$ and supplies the selected R vectors to the beamforming controller 150 which, in turn, applies a different one of the R vectors each time a training signal is received. In some embodiments, selection of R vectors from the set $u_1, u_2 \ldots u_{Nrx}$ can be implemented at the base vector generator 158 rather than at the vector selection unit 154. Further, in certain modes of operation of the receiving device 14, R=$N_{rx}$, and the vector selection unit 154 accordingly supplies every one of the $Nr_x$ base vectors of the matrix U to the beamforming controller 150.

The reference signal storage 160 can include a memory component to store a known training signal s specified by the communication protocol or agreed upon during an earlier stage of communication, for example. The known training signal s may be a data unit or a data packet, or a portion, such as a payload, of the data unit or data packet, for example, associated with certain parameters such as spreading sequences, modulation scheme, etc. The reference signal storage 160 supplies the known training signal to the vector selection unit 154 which determines an efficient receiver AWV using the techniques discussed herein. If desired, the reference signal storage 160 may also store multiple training signals for use with different procedures or when a beamforming procedure involves instances of more than one training signal.

The analog/digital receive data path 104 supplies the received signal y to the quality assessment unit 108 and to the vector selection unit 154. During beamforming, each received signal y corresponds to an instance of the training signal s received via the antenna array 102. Thus, R instances of the known training signal s correspond to received signals $y_1, y_2, \ldots y_R$ defining a vector y. The analog/digital receive data path 104 may also supply the received signals $y_1, y_2, \ldots y_R$ to the quality assessment unit 108, which may use any desired technique to generate quality indicators or metrics for the signals $y_1, y_2, \ldots y_R$. The quality assessment unit 156 supplies each calculated quality indicator to the vector selection unit 154. If desired, the quality assessment unit 156 can supply only some of the quality indicators (e.g., quality indicators exceeding a certain threshold value) to the vector selection unit 154. Using the received signals $y_1, y_2, \ldots y_R$, R AWVs from the set $u_1, u_2 \ldots u_{Nrx}$, and the known signal s, the vector selection unit 154 determines an efficient receiver AWV û. The receiving device 14 can use the AWV û to receive data units until the Rx beamforming procedure is repeated, for example. Additionally, the receiving device 14 can store the vector û and/or the vectors $y_1, y_2, \ldots y_R$ in the past vector storage 162 to improve subsequent beamforming procedures. Example techniques for generating the vector û are discussed in more detail below, following the discussion of an example transmitter architecture with reference to FIG. 3.

Figure 3:
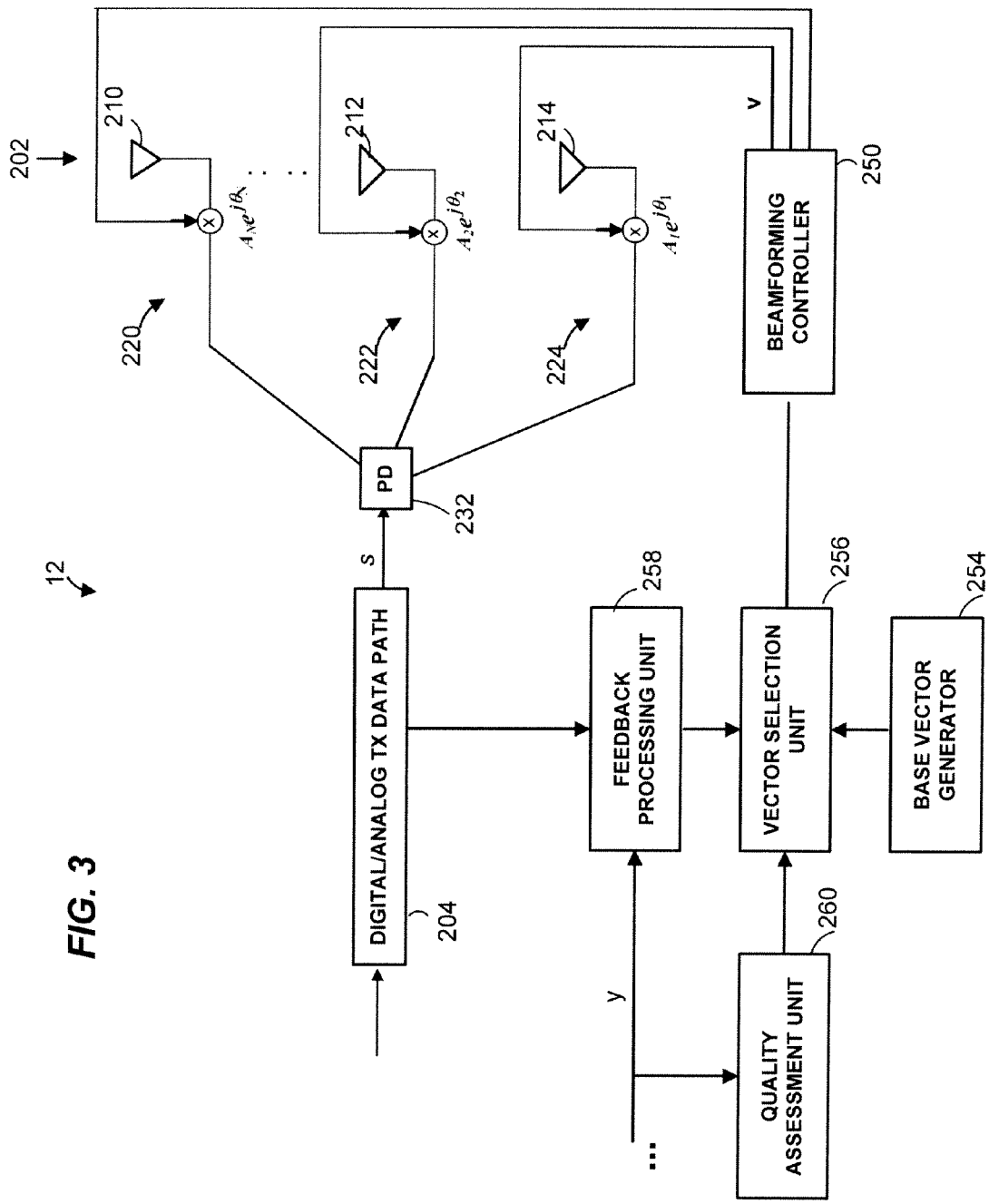
FIG. 3 is a block diagram of an example architecture of the transmitting device of FIG. 1.

Referring now to FIGS. 2 and 3, in general, the architecture of the transmitting device 12 may be similar to the architecture of the receiving device 14. Of course, a device operating in the communication system 10 may be both a receiver and a transmitter (in respective operational states, for example). Thus, although FIGS. 2 and 3 illustrate receiver and transmitter architectures separately for the purposes of clarity, a device equipped with an antenna array and adapted to communicate via the channel 16 can have a common transceiver architecture with components illustrated in FIGS. 2 and 3. For example, a transceiver device can include a common base vector generator (such as the base vector generator 158) for generating base vectors for both receive beamforming training and transmit beamforming training, a common beamforming controller (such as the beamforming controller 150) for controlling the antenna array during both receive beamforming training and transmit beamforming training, etc., as well as components specific to transmitter and receiver operations such as the reference signal storage 160 or a feedback processing unit discussed below.

Referring now to FIG. 3, the transmitting device 12 includes an antenna array 202 coupled to a shared digital/analog transmitter data path 204. The antenna array 202 has $N_{tx}$ antennas including antennas 210, 212, and 214 coupled to respective delay lines 220, 222, and 224, which can be digitally controllable and which define a beamforming network 230. Each of the delay lines 220, 222, and 224 can shift the signal received from the corresponding antenna 210, 212, or 214 by a respective phase shifting angle $\theta$. Together, the antenna array 202 and the delay lines 220, 222, and 224 define a phased antenna array of the transmitting device 12.

A splitter or power divider 232 supplies the signal s from the shared digital/analog transmit data path 204 to the antennas 210-214, to be shifted by the corresponding angles $\theta_1, \theta_2, \ldots \theta_{Ntx}$ prior to transmission to the receiving device 14. As in the example illustrated in FIG. 2, the digital/analog transmit data path 204 can include some or all of such components as an equalizer, a decoder, a de-interleaver, a demodulator, an A/D converter, a Fast Fourier Transform (FFT) processing block, etc.

A vector selection unit 256 supplies an AWV v to a beamforming controller 250. Similar to the AWV u, the AWV v specifies phase shifting angles $\theta_1, \theta_2, \ldots \theta_{Ntx}$ for each antenna in the antenna array 202, and the beamforming controller 250 applies the angles $\theta_1, \theta_2, \ldots \theta_{Ntx}$ to the respective delay lines 220, 222, and 224. Also similar to the example illustrated in FIG. 2, a base vector generator 254 supplies $N_{tx}$ AWVs $v_1, v_2 \ldots v_{Ntx}$, defining a complete set of base vectors of a unitary matrix V, to the vector selection unit 256. During beamforming, the vector selection unit 256 may select R vectors from the set $v_1, v_2 \ldots v_{Ntx}$ and supply the selected R vectors to the beamforming controller 250 which, in turn, applies a different one of the R vectors each time the training signal s is transmitted. In some embodiments, selection of R vectors from the set $v_1, v_2, \ldots v_{Ntx}$ can be implemented at the base vector generator 254 rather than at the vector selection unit 256. Further, in certain modes of operation of the transmitting device 12, $R=N_{tx}$, and the vector selection unit 256 accordingly supplies every one of the $N_{tx}$ base vectors of the matrix V to the beamforming controller 250.

Each of a feedback processing unit 258 and a quality assessment unit 260 can receive a feedback signal descriptive of the signal y received at the receiving device 14 for a particular transmitted instance of the training signal s. During beamforming, R instances of the known training signal s correspond to received signals $y_1, y_2, \ldots y_R$ defining a vector y. Using the received feedback signals $y_1, y_2, \ldots y_R$, R AWVs from the set $v_1, v_2 \ldots v_{Ntx}$, and the training signal s, the vector selection unit 256 can determine an efficient transmitter AWV v̂. As indicated above, the vector y can be also supplied to the quality assessment unit 260 to generate quality indicators or metrics for the signals $y_1, y_2, \ldots y_R$. The quality assessment unit 260 can then supply each calculated quality indicator to the vector selection unit 256.

Referring to both FIG. 2 and FIG. 3, a signal y received at the receiving device 14 and corresponding to a training signal s transmitted from the transmitting device 12 is given by $$y=uHvs, \text{ where} \quad (1)$$

u is a receiver AWV having one column and $N_{rx}$ rows;
v is a receiver AWV having $N_{tx}$ columns and one row; and
H is a channel gain matrix having dimensions $N_{rx} \times N_{tx}$.

For ease of illustration, equation (1) does not include a noise term.

Of course, it is desirable that each value of y be as close to the transmitted signal s as possible, and an ideal value of the receiver AWV yields y=s. In other words, it is desirable that the communication system 10 alter s as little as possible. Referring to (1), it will be noted that y is equal to s when the receiver AWV u is û given by:

$$\hat{u}=(Hv)^H, \text{ where} \quad (2)$$

the superscript H denotes a Hermitian matrix, because then $$y=\hat{u}Hvs=(Hv)^H Hvs=s.$$

To consider beamforming at the receiving device 14 first, the transmitting device 12 can select an AWV v during an earlier beamforming training stage, which may be a coarse resolution beamforming training stage, for example, or using any other technique. The transmitter 12 can then transmit the training signal s $N_{rx}$ times to the receiving device 14 which updates the AWV u to another one of $u_1, u_2, \ldots u_{Nrx}$ defining a unitary matrix U each time the training signal s is transmitted:

$$U=[u_1, u_2, \ldots u_{Nrx}]$$

As discussed above, the received signals $y_1, y_2, \ldots y_{Nrx}$ define the vector y:

$$y=[y_1, y_2, \ldots y_{Nrx}]^T$$

so that $$y=UHvs \quad (3)$$

Next, it will be observed that $$y \cdot s^H = UHv \cdot s \cdot s^H = UHv,$$

$$U^H y \cdot s^H = U^H UHv, \text{ and thus}$$

$$U^H y \cdot s^H = Hv \quad (4)$$

Combining (4) with (2), the best estimate of the receiver AWV û is then given by:

$$\hat{u}=(Hv)^H=sy^H U \quad (5)$$

Referring to FIG. 2, the vector selection unit 154 can generate the vector û during the Rx beamforming procedure using the signal s supplied by the reference signal storage 160, the matrix U (or the base vectors of the matrix U) supplied by the base vector generator 158, and the receive vector y from the analog/digital Rx data path 104.

When implementing Rx beamforming according to the equation (5), the vector selection unit 154 can generate the vector û once every base vector of the unitary matrix U has been applied to the antenna array 102, and every respective signal y has been received. Because the unitary matrix U is necessarily a square matrix, the vector selection unit 154 requires that $N_{rx}$ vectors be used. In some embodiments, particularly when the number of receive antennas $N_{rx}$ is relatively low, a look-up table storing vectors $u_1, u_2, \ldots u_{Nrx}$ can be used to expedite processing. Alternatively, the vector selection unit 154 can reduce computational complexity during beamforming by selecting only a subset of R vectors from the set $u_1, u_2, \ldots u_{Nrx}$ and accordingly transmitting only R training units. In this case, the vector û is given by:

$$\hat{u}=sy_R^H U_{R,N_{RX}}, \text{ where} \quad (6)$$

the vector $y_R$ includes R elements and the matrix $U_{R,N_{RX}}$ accordingly includes R rows and $N_{rx}$ columns of the unitary matrix U.

When using a reduced set of base vectors, the vector selection unit 154 can select the vectors from the set $u_1, u_2, \ldots u_{Nrx}$ based on past beamforming history, for example. To this end, the vector selection unit 154 can store a subset of AWVs used previously, along with the vector 11, in the past vector storage 162. A certain iteration of the Rx beamforming procedure can generate the vector û based on the base vectors $u_3, u_4$, and $u_5$, for example, and a subsequent repetition of Rx beamforming may apply the vectors $u_3, u_4$, and $u_5$ first. In general, the vectors in a subset associated with the vector û need not be consecutive vectors in the set $u_1, u_2, \ldots u_{Nrx}$. To assess the quality of a signal corresponding to a subset of R vectors, the quality assessment unit 156 can calculate average the quality indicators for each of the signals y corresponding to the R training units, for example. If the receiving device 14 cannot obtain an acceptable AWV û based on these vectors (i.e., if the quality assessment unit 156 generates a quality indicator for the set of R vectors below a certain threshold value), the vector selection unit 154 can proceed to apply vectors $u_1, u_2$, etc.

By way of a more specific example, the receiving device 14 can, during a certain iteration of Rx beamforming, receive multiple instances of the training signal s while applying different vectors $u_i$ from the set $u_1, u_2, \ldots u_{Nrx}$ as antenna weight vectors to the antennas 110-114, and the quality assessment unit 156 may check the resulting quality of the corresponding received signal before applying the next vector $u_i$. Based on previously conducted coarse sweeping (or according to another selection principle), the receiving device 14 can select the vector $u_3$ first, and the quality assessment unit 156 may detect that an acceptable quality of the received signal has been reached after applying $u_5$.

As another alternative, the vector selection unit 154 can iteratively apply AWVs from the set $u_1, u_2, \ldots u_{Nrx}$ until a quality indicator obtained from the quality assessment unit 156 indicates than the respective signal y has an acceptable (although possibly not optimal) quality. The vector selection unit 154 can then skip the rest of the set $u_1, u_2, \ldots u_{Nrx}$ and generate the AWV û based on the available data. In this embodiment, the order in which the vector selection unit 154 steps through the sequence $u_1, u_2, \ldots u_{N_{rx}}$ may be made more efficient by utilizing past beamforming data stored in the past vector storage 162.

The transmitting device 12 can determine the transmitter antenna weight vector v̂ in a similar manner. In particular, if the AWVs $v_1, v_2 \ldots v_{Ntx}$ completely define the set of base vectors of a unitary matrix V, the vector v̂ can be calculated according to $$\hat{v} = sVy^H \quad (7)$$

or, if only a subset of R vectors is being used, $$\hat{v} = sV_{N_{Tx}R}y_R^H \quad (8)$$

where the vector $y_R$ includes R elements and the matrix $v_{N_{Tx}R}$ includes $N_{tx}$ rows and R columns of the unitary matrix V. As illustrated in FIG. 3, the transmitting device 12 can receive one or several feedback data units that specify the elements of the vector y (or $y_R$) from the receiving device 14. If desired, the receiving device 14 can transmit a feedback packet with only the dominant (i.e., best) set of signals y. As one example, the quality assessment unit 260 can generate a quality metric for each signal y and compare each quality metric to a threshold value, so that the receiving device 14 may include only those signals y that exceed the threshold value in the dominant set. As another example, the receiving device 14 can determine the dominant set by ranking the signals y and selecting the top N signals.

Generally with respect to Rx and Tx beamforming, the unitary matrices U and V can be phase-only matrices if the antenna arrays 102 or 202 are phased antenna arrays in which signal amplitude is not adjusted for individual antennas. In these embodiments, a discrete Fourier transform (DFT) engine can be efficiently used to generate the matrix U or V because the DFT engine similarly utilizes a unitary phase-only matrix.

In some embodiments, the vector selection unit 154 or 256 may generate an efficient AWV û or v̂ that specifies both an amplitude and a phase shift component for each antenna. To apply the vector û or v̂ to a phase-shift-only antenna array, the vector selection unit 154 or 256 can scale, or simply set, the amplitude of each element to unity.

Further, the vector selection unit 154 or 256 can generate an efficient AWV û or v̂ that does not precisely match the resolution of the antenna array 102 or 202. For example, an element of the vector û may specify the phase shift of 33.25° whereas the resolution of the antenna array may be 5°, so that an allowable phase shift at an antenna is 5°, 10°, 15°, etc. In this case, the vector selection unit 154 or 256 can additionally adjust the vector û or v̂ to match the desired resolution by setting each element to the closest allowable value (thus, 33.25° may be adjusted up to 35°). Such adjustments can be referred to as quantizing the phase shifts. The vector selection unit 154 or 256 can similarly quantize a gain-only vector û or v̂, when applicable. In general, an efficient AWV û or v̂ may be scaled or adjusted (or quantized) in any suitable manner to make the vector û or v̂ compatible with a particular antenna array (which may be a phase-shift-only antenna array, a gain-only antenna array, a complex beamforming antenna array, etc. and which may be associated with any desired resolution and other parameters).

Still further, the Rx and Tx beamforming procedures discussed above can be carried out in frequency domain for each of a plurality of sub-carriers available in the communication channel 16. Upon generating several efficient AWVs $\hat{u}_{c_i}$ or $\hat{v}_{c_i}$ for each sub-carrier $c_i = c_1, c_2, \ldots c_n$, the vector selection unit 154 or 256 can select the vector $\hat{u}_{c_i}$ or $\hat{v}_{c_i}$ associated with the highest power, or apply any other suitable selection method to generate the vector û or v̂ based on multiple vectors $\hat{u}_{c_i}$ or $\hat{v}_{c_i}$.

Alternatively or additionally, an Rx and Tx beamforming procedure can include several iterations at distinct points in time, so that the vector selection unit 154 or 256 can generate multiple efficient AWVs $\hat{u}_{t_i}$ or $\hat{v}_{t_i}$ at different times $t_i = t_1, t_2, \ldots$, and select the vector û or v̂ from among the multiple vectors $\hat{u}_{t_i}$ or $\hat{v}_{t_i}$ based on the power associated with each vector or another criterion.

In some embodiments, an ordered effective SINR or SNR vector is used instead of the y vector in generating the AWVs û or v̂ will be noted that the beamforming technique in these implementations becomes a gain-only weighing solution. However, using SINR or similar data may significantly simplify computation of the vector û or v̂.

As an alternative to generating the transmitter AWV v̂ at the transmitting device 12, the transmitting device 12 can iteratively apply different base vectors of a unitary matrix V to the antennas 210-214 during Tx beamforming, and include these base vectors (or the corresponding identifiers) in the training signal s or some other signal sent to the receiving device 14. The receiving device 14 can then calculate the transmitter AWVs v̂ using the formula (7) or the formula (8), for example, and feed back the AWVs v̂ to the transmitting device 12. It is noted that in this embodiment, the receiving device 14 need not feed back the signals y to the transmitting device 12.

Generally with respect to the receiver architecture illustrated in FIGS. 2 and 3, it will be noted that various ones of the modules illustrated therein may be implemented using hardware, software instructions executed by a processor, firmware, instructions executed by a processor, or combinations thereof. Moreover, some of the components in FIGS. 2 and 3 may be custom integrated circuits, application-specific integration circuits (ASICs), etc., communicatively coupled by electrical busses, for example.

The transmitting device 12 and the receiving device 14 can carry out the respective Rx and Tx beamforming procedures in any order. For example, the transmitting device 12 may first determine an efficient transmitter AWV and use the efficient transmitter AWV when sending training signals to the receiving device 14. Alternatively, the receiving device 14 may determine an efficient receiver AWV prior to Tx beamforming. As yet another alternative, one or both of the transmitting device 12 and the receiving device 14 may carry out the respective Tx or Rx beamforming procedure multiple times. During a multi-stage sector Rx sweeping procedure, for example, the receiving device 14 applies different beamforming vectors (such as AWVs) to the antenna array 12 as each training signal is received, with the sector being swept at each stage being progressively narrower. Some of the examples of timing and ordering of Rx and Tx beamforming procedures which the devices 12 and 14 may implement are described in commonly-owned, co-pending U.S. patent application Ser. No. 12/548,393, filed on Aug. 26, 2009, and entitled "Beamforming by Sector Sweeping," which is hereby expressly incorporated by reference herein, and in the U.S. Provisional Patent App. No. 61/091,914 entitled "Beamforming by Sector Sweeping," filed Aug. 26, 2008, also expressly incorporated by reference herein.

In one particular embodiment, the receiving device 14 conducts Rx beamforming described above during a beam refinement stage of a multi-stage sector sweeping procedure. Prior to the beam refinement stage, the receiving device 14 conducts "coarse" sector sweeping stage to identify a (typically wide) sector in which a signal from the transmitting device 12 generates the highest power. The receiving device 14 then partitions the identified sector into multiple smaller sub-sectors in the beam refinement stage and sweeps through these sub-sectors to identify a more specific direction in which the antenna array 12 should be steered to maximize receive power. Of course, the receiving device 14 can further refine sector sweeping during as many stages as desired.

Figure 4:
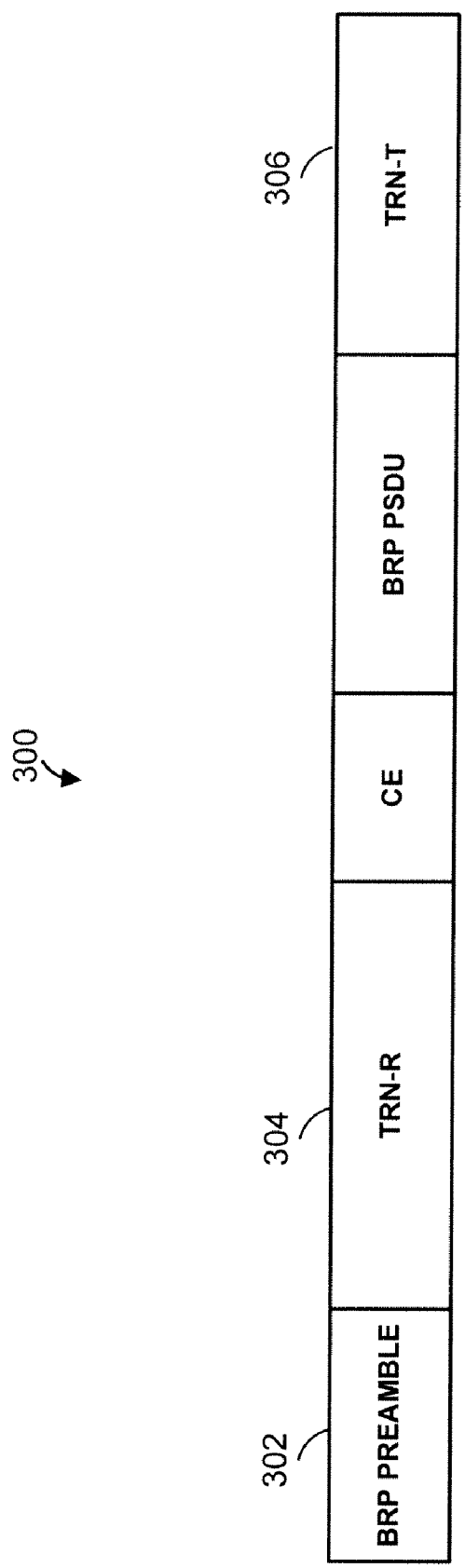
FIG. 4 is a block diagram of an example superframe that includes a receiver beamforming period and a transmitter beamforming period.

FIG. 4 illustrates one example of a superframe 300 in which an Rx beamforming training (TRN-R) period 304 occurs after a preamble period 302, and a Tx beamforming training (TRN-T) period 306 occurs several periods after the TRN-R period 304. The periods 304 and 306 may correspond to coarse sweeping stages, beam refinement stages, or both. In other words, coarse sweeping and/or beam refinement procedures for receive beamforming training may occur during the period 304, and coarse sweeping and/or beam refinement for transmit beamforming training may occur during the period 306.

FIGS. 5-8 illustrate flow diagrams of several example methods that the receiving device 14 and the transmitting device 12 may implement using hardware, firmware instructions implemented on a processor, software, or any combination thereof to support efficient digital beamforming techniques discussed herein. The various blocks illustrated in these diagrams may be implemented by various components illustrated in FIGS. 2 and 3 in any desired manner. Thus, it will be appreciated that FIGS. 2 and 3 illustrate specific arrangements of components that may implement particular blocks of FIGS. 5-8 by way of example only.

Figure 5:
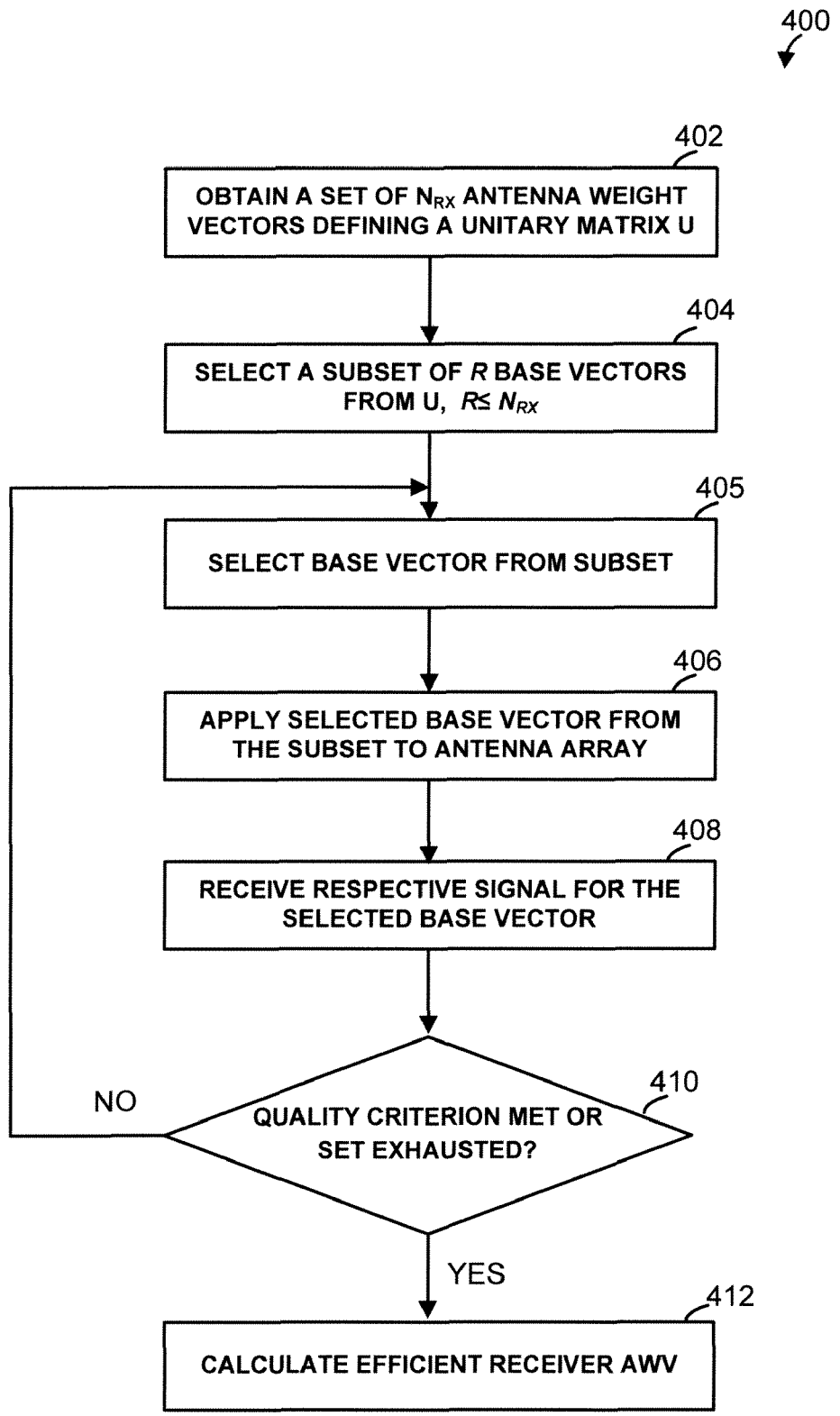
FIG. 5 is a flow diagram of an example method for generating an efficient receiver AWV which may be implemented by a receiving device such as the example receiving device of FIG. 2.

Referring to FIG. 5, the receiving device 14 (see FIGS. 1 and 2) can implement an example method 400 to generate an efficient receiver AWV. In block 402, the receiving device 14 obtains (e.g., by generating, retrieving from memory, receiving from a wired interface, etc.) $N_{rx}$ base vectors of a unitary matrix having $N_{rx}$ rows and $N_{rx}$ columns, each specifying antenna weight parameters so that each of the base vectors is an AWV. Next, the receiving device 14 selects a subset of R vectors from the $N_{rx}$ base vectors based on past beamforming data, in a sequential order, in a random order, or in any other suitable manner (block 404). In some cases, R may be equal to $N_{rx}$, i.e., the receiving device 14 may accordingly select as many vectors as there are receive antennas, or the block 404 may be omitted.

In blocks 405-410, the receiving device 12 iteratively steps through the subset of selected base vectors. In particular, the receiving device 12 selects a base vector from the subset of R vectors in block 405, applies the antenna weight factors specified by the selected base vector in block 406, receive a training signal via the antenna array 102 steered according to the selected base vector in block 408, and check whether the set has been exhausted in block 410. During this step, optionally, the receiving device 12 may check for other conditions such as whether a certain quality threshold has been met even though the set has been only partially exhausted, for example. If the set has not been exhausted, and if quality threshold has not been met (optional), flow proceeds back to block 405. Other flow proceeds to block 412. Finally, in block 412, the receiving device 12 generates a receiver AWV applying the formula (5) or using another suitable technique that relies on the received signals, the set of selected base vectors, and the training signal.

Figure 6:
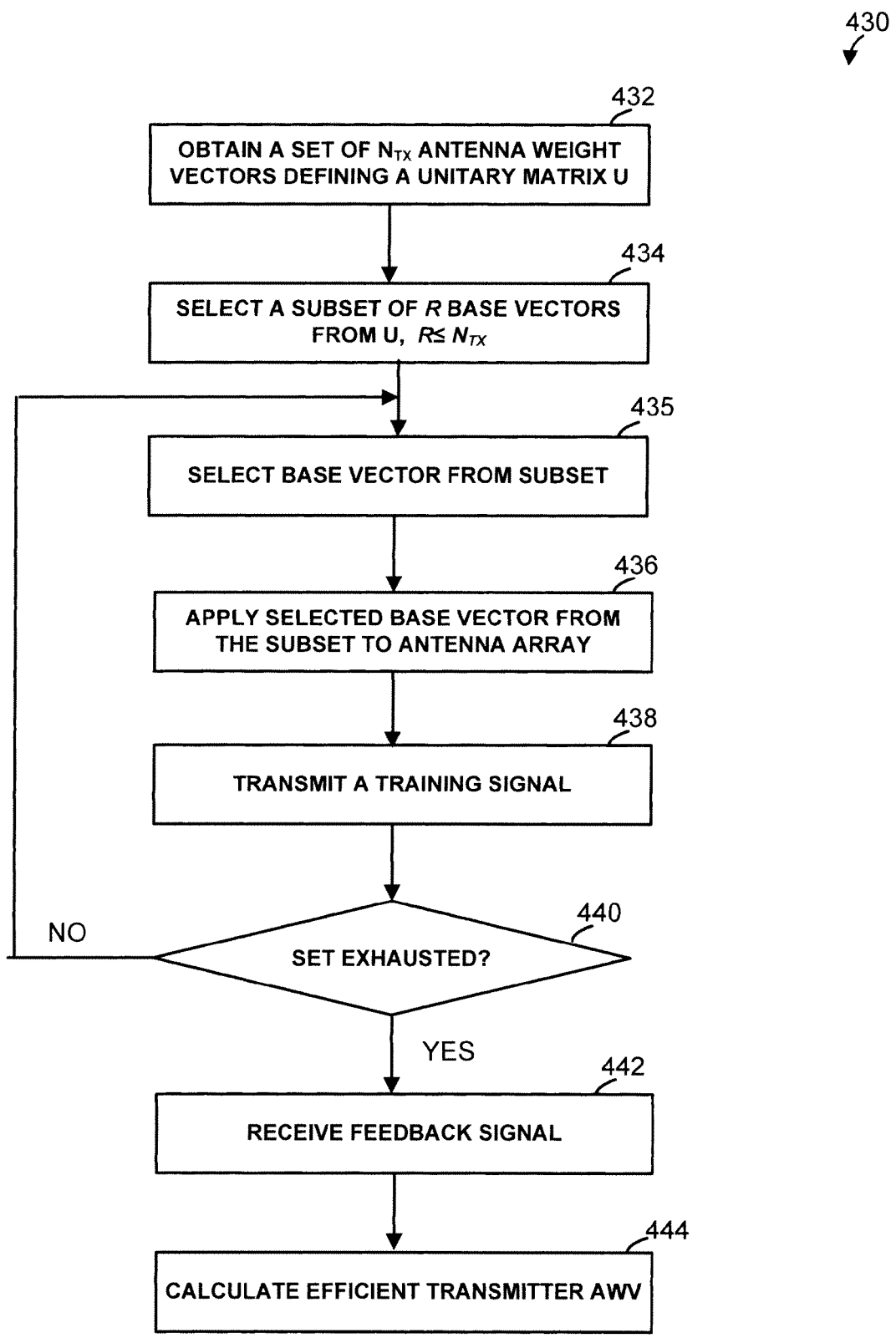
FIG. 6 is a flow diagram of an example method for generating an efficient transmitter AWV which may be implemented by a transmitting device such as the receiving device of FIG. 3.

FIG. 6 illustrates an example method 430 which the transmitting device 12 can implement to generate a transmitter AWV. Similar to the method 400, the transmitting device 12 obtains $N_{tx}$ base vectors of a unitary matrix in block 432 to be used as antenna weight vectors in block 432. Next, the transmitting device 12 selects a subset of R vectors from the $N_{tx}$ base vectors in block 434, and iteratively applies the selected vectors to the antenna array 202 as a certain training signal is transmitted until the set is exhausted or another condition is satisfied (blocks 436-440). In particular, the transmitting device 12 selects a base vector from the subset or R vectors at block 435, applies the selected vector to the antennas 210-214 at block 436, transmits a training signal (which may be the same signal for all vectors applied at block 436) to the receiving device 14 at block 438, and checks whether the set of R vectors has been exhausted at block 440. If the set has not been exhausted, flow proceeds back to block 435. Otherwise, flow proceeds to block 442. It will be noted, however, that the transmitting device 12 may be unable to evaluate the quality of signals, received by the receiving device 14 and corresponding to the transmitted training signal and to a respective AWV, until after multiple instances of the training signal are transmitted and a feedback data unit is received in block 442. Of course, a communication protocol implemented by the devices 12 and 14 may alternatively specify that the feedback data unit can be transmitted after each training signal or according to any other schedule. In block 444, the transmitting device 12 generates an efficient transmitter AWV using the feedback data unit(s), the selected base vectors, and the training signal.

Figure 7:
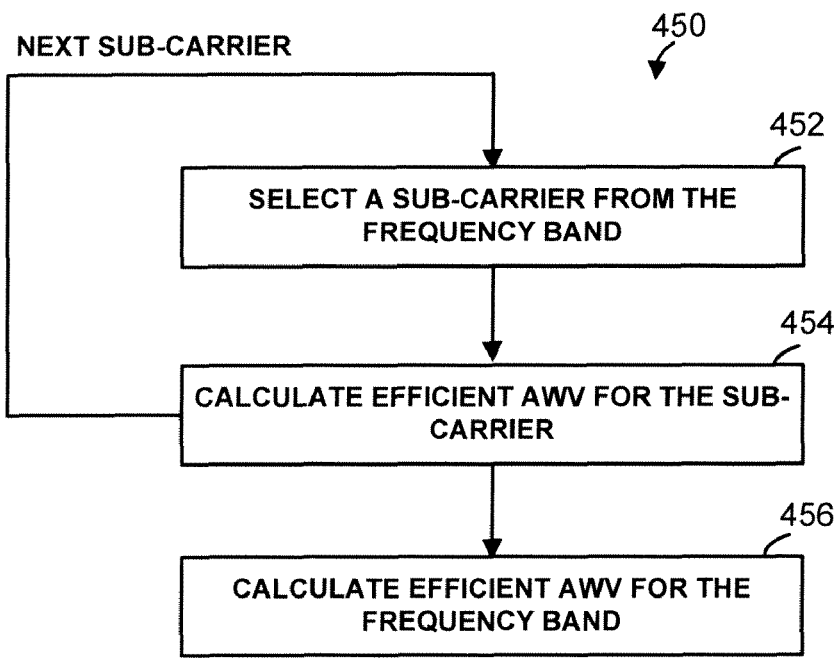
FIG. 7 is a flow diagram of an example method for generating an efficient receiver or transmitter AWV for a channel that includes multiple carrier frequencies or frequency subcarriers.

Referring to FIG. 7, one or both of the devices 12 and 14 may implement an example method 450 to generate an AWV for each of several sub-bands or carriers (blocks 452-454) and select an efficient AWV (block 456) based on these carrier-specific values. More specifically, the devices 12 or 14 may simply select the best AWV from among the set of carrier-specific AWVs, calculate an average and quantize or scale the average to meet the resolution requirements of the corresponding antenna array, or use any other suitable technique. Block 454 may include all or some of the blocks of the method 400 or method 430, for example.

Figure 8:
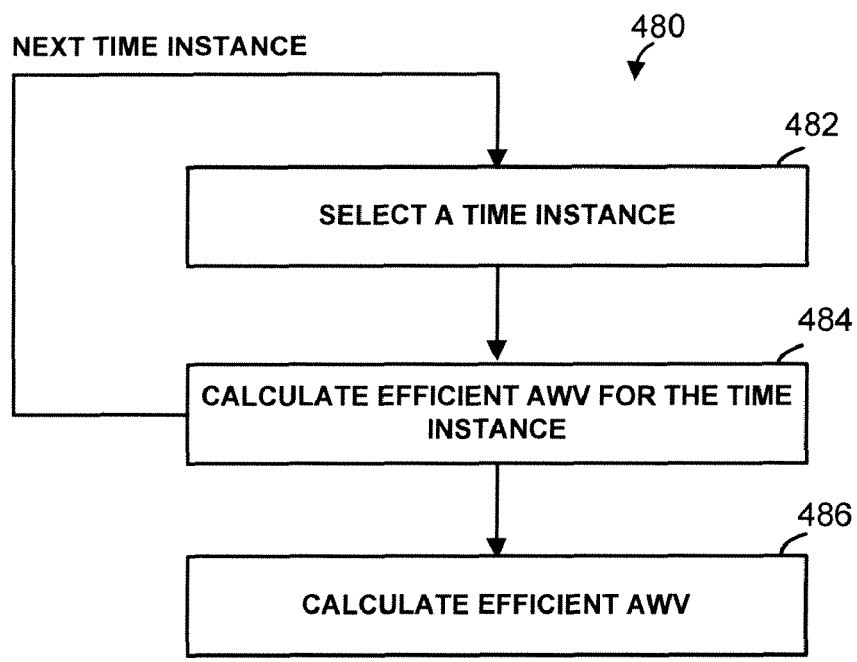
FIG. 8 is a flow diagram of an example method for generating an efficient receiver or transmitter AWV using vectors generated at different instances of time.

Similarly, the device 12 or 14 can implement an example method 480 illustrated in FIG. 8 to generate AWVs at several time instances (block 482-484) and calculate an efficient transmitter or receiver AWV based on these multiple time-specific AWVs. As is known, a communication channel such as the channel 16 may change due to environmental conditions, interference, and other factors. Thus, the devices 12 and 14 may implement the method 480 to at least partially account for the variance of the channel 16 over time.

As least some of the various blocks, operations, and techniques described above can be implemented in hardware, firmware, software instructions implemented on a processor, or any combination thereof. When implemented in software instructions executable on a processor, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the beamforming techniques have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for beamforming in a communication system, the method comprising:
    receiving a plurality of signals via a plurality of antennas, wherein the plurality of signals corresponds to at least one known training signal, and wherein each signal of the plurality of signals is received at a different time;
    generating a respective one of a plurality of different antenna weight vectors to be applied to the plurality of antennas as each signal of the plurality of signals is received, wherein each of the plurality of antenna weight vectors is a respective base vector of a unitary matrix; and
    generating a receiver antenna weight vector based on at least a mathematical combination of i) the received plurality of signals, ii) the plurality of different antenna weight vectors, and iii) the at least one known training signal.

2. The method of claim 1, wherein a number of antenna weight vectors in the plurality of different antenna weight vectors is equal to a number of antennas in the plurality of antennas, so that the plurality of different antenna weight vectors completely defines the unitary matrix.

3. The method of claim 1, wherein a number of antenna weight vectors in the plurality of different antenna weight vectors is less than a number of antennas in the plurality of antennas.

4. The method of claim 3, further comprising selecting the plurality of different antenna weight vectors from the unitary matrix based on a past history of selecting receiver antenna weight vectors for receive beamforming.

5. The method of claim 3, further comprising:
    generating a respective quality indicator for each antenna weight vector in the plurality of antenna weight vectors based on the received plurality of signals; and
    comparing each quality indicator to a threshold quality value,
    wherein generating the receiver antenna weight vector is based on whether one or more quality indicators meet the threshold quality value.

6. The method of claim 1, wherein each of the plurality of different antenna weight vectors is a phase-only vector.

7. The method of claim 6, wherein the unitary matrix is a discrete Fourier transform (DFT) matrix.

8. The method of claim 1, further comprising setting an amplitude of the receiver antenna weight vector to unity.

9. The method of claim 1, further comprising:
    repeating receiving the plurality of signals, generating the respective one of the plurality of different antenna weight vectors, and generating the receiver antenna weight vector for each of a plurality of sub-carriers to define a plurality of sub-carrier-specific receiver antenna weight vectors; and
    wherein generating the receiver antenna weight vector is based on the plurality of sub-carrier-specific receiver antenna weight vectors.

10. The method of claim 1, further comprising:
    repeating receiving the plurality of signals, generating the respective one of the plurality of different antenna weight vectors, and generating the receiver antenna weight vector at each of a plurality of time-instances to define a plurality of time-specific receiver antenna weight vectors; and
    wherein generating the receiver antenna weight vector is based on the plurality of time-specific receiver antenna weight vectors.

11. The method of claim 1, further comprising:
    generating an ordered effective SINR vector based on the received plurality of signals; and
    wherein selecting the receiver antenna weight vector includes using the ordered effective SINR vector.

12. An apparatus comprising:
    a base vector generator to provide a plurality of different antenna weight vectors, wherein each of the plurality of different antenna weight vectors is a respective base vector of a unitary matrix;
    a reference signal storage to store at least one training signal; and
    a vector selection unit configured to
        receive a plurality of signals, each signal being received at a different time via a plurality of antennas using a different one of the plurality of different antenna weight vectors, and
        generate a receiver antenna weight vector based on at least a mathematical combination of i) the plurality of antenna weight vectors, ii) the received plurality of signals, and iii) the at least one training signal.

13. The apparatus of claim 12 further comprising:
    a beamforming network including a plurality of controllable delay lines, wherein each of the plurality of controllable delay lines is coupled to a respective one of the plurality of antennas; and
    a beamforming controller to receive antenna weight vectors from the vector selection unit and apply the antenna weight vectors to the beamforming network during a beamforming training procedure.

14. The apparatus of claim 12, further comprising:
    a quality assessment unit to generate a plurality of quality indicators, wherein each of the plurality of quality indicators corresponds to a respective one of the received plurality of signals;
    wherein the vector selection unit is configured to select the plurality of antenna weight vectors from a set of base vectors of the unitary matrix based on the plurality of quality indicators; and
    wherein the vector selection unit determines whether to provide a particular antenna weight vector to a beamforming controller based at least on the plurality of quality indicators.

15. The apparatus of claim 12, further comprising:
    a past vector storage to store at least one of previously generated receiver antenna weight vectors or the plurality of different antenna weight vectors.

* * * * *